US008842693B2

(12) United States Patent
Agrawal et al.

(10) Patent No.: US 8,842,693 B2
(45) Date of Patent: Sep. 23, 2014

(54) RANK STEP-DOWN FOR MIMO SCW DESIGN EMPLOYING HARQ

(75) Inventors: Avneesh Agrawal, San Diego, CA (US); Aamod Khandekar, San Diego, CA (US); Hemanth Sampath, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 757 days.

(21) Appl. No.: 11/441,742

(22) Filed: May 25, 2006

(65) Prior Publication Data

US 2007/0011550 A1 Jan. 11, 2007

Related U.S. Application Data

(60) Provisional application No. 60/731,146, filed on Oct. 28, 2005, provisional application No. 60/686,111, filed on May 31, 2005.

(51) Int. Cl.
*H04J 3/22* (2006.01)
*H04J 13/00* (2006.01)

(52) U.S. Cl.
USPC .................... 370/465; 370/479; 370/329

(58) Field of Classification Search
CPC .. H04B 7/0413; H04B 7/0456; H04B 7/0486; H04B 7/063
USPC ......... 370/329, 335, 336, 342, 344, 347, 431, 370/441, 442, 464, 479, 480, 542, 252, 370/465; 375/299, 260, 267, 346; 714/746; 455/101, 460, 561, 562.2
See application file for complete search history.

(56) References Cited

U.S. PATENT DOCUMENTS

| 6,802,035 B2 * | 10/2004 | Catreux et al. ................ 714/746 |
| 7,042,869 B1 | 5/2006 | Bender |
| 7,058,367 B1 * | 6/2006 | Luo et al. ...................... 455/101 |
| 7,099,678 B2 * | 8/2006 | Vaidyanathan ............... 455/500 |
| 7,298,717 B2 | 11/2007 | Hui et al. |

(Continued)

FOREIGN PATENT DOCUMENTS

| CL | 2717-2004 | 8/2005 |
| CL | 3086-2004 | 10/2005 |

(Continued)

OTHER PUBLICATIONS

Chang et al., "Reduced-Rank Antenna Selection for MIMO DS-CDMA Channels," Circuits and Systems, IEEE International Symposium on Kobe, pp. 1730-1733 (2005) XP-010815837.

(Continued)

*Primary Examiner* — Michael Thier
*Assistant Examiner* — Feben M Haile
(74) *Attorney, Agent, or Firm* — Howard Seo

(57) ABSTRACT

Systems and methodologies are described that facilitate reducing rank (e.g., of a user device) as a number of transmissions there from increases. Such rank step-down can improve interference resistance and facilitate maintaining code rate despite transmission propagation. Additionally, rank step-down information can be encoded along with CQI information to generate a 5-bit CQI signal that can facilitate updating a user's rank upon each CQI transmission (e.g., approximately every 5 ms). The described systems and/or methods can be employed in a single code word (SCW) wireless communication environment with a hybrid automatic request (HARQ) protocol.

42 Claims, 12 Drawing Sheets

(56) References Cited

U.S. PATENT DOCUMENTS

| | | | |
|---|---|---|---|
| 7,333,551 B2* | 2/2008 | Hwang et al. | 375/265 |
| 7,616,698 B2 | 11/2009 | Sun et al. | |
| 2002/0102950 A1 | 8/2002 | Gore et al. | |
| 2003/0156572 A1 | 8/2003 | Hui et al. | |
| 2003/0185309 A1 | 10/2003 | Pautler et al. | |
| 2004/0196919 A1 | 10/2004 | Mehta et al. | |
| 2005/0068918 A1 | 3/2005 | Mantravadi et al. | |
| 2005/0075081 A1 | 4/2005 | Catreux-Erceg et al. | |
| 2005/0085195 A1 | 4/2005 | Tong et al. | |
| 2005/0254596 A1 | 11/2005 | Naguib | |
| 2006/0114813 A1 | 6/2006 | Seki et al. | |
| 2007/0255993 A1 | 11/2007 | Yap et al. | |
| 2008/0063115 A1* | 3/2008 | Varadarajan et al. | 375/299 |
| 2009/0225737 A1* | 9/2009 | Kim et al. | 370/342 |

FOREIGN PATENT DOCUMENTS

| | | |
|---|---|---|
| CL | 43.703 | 8/2008 |
| CN | 1502180 A | 6/2004 |
| EP | 1 294 120 | 3/2003 |
| EP | 1615365 A1 | 1/2006 |
| EP | 1615385 | 1/2006 |
| EP | 1 635 518 | 3/2006 |
| JP | 2004040232 A | 2/2004 |
| JP | 2004194262 A | 7/2004 |
| JP | 2004260659 A | 9/2004 |
| JP | 2006067237 | 3/2006 |
| JP | 2006197403 A | 7/2006 |
| KR | 102003002354 | 3/2003 |
| WO | WO0120874 | 3/2001 |
| WO | WO 03/041300 | 5/2003 |
| WO | 2004047354 | 6/2004 |
| WO | WO 2004/114610 | 12/2004 |
| WO | WO 2005/004376 | 1/2005 |
| WO | WO 2005/034387 | 4/2005 |
| WO | WO2005036799 | 4/2005 |
| WO | 2005046113 A2 | 5/2005 |
| WO | 2005050885 A1 | 6/2005 |
| WO | 2006030478 A1 | 3/2006 |
| WO | WO2006022372 | 3/2006 |
| WO | WO 2006/069300 | 6/2006 |
| WO | WO 2006/069397 | 6/2006 |

OTHER PUBLICATIONS

Das et al., "Adaptive, Asynchronous Incremental Redundancy (A2IR) with Fixed Transmission Time Intervals (TTI) for HSDPA," Personal, Indoor and Mobile Radio Communications, 13th IEEE International Symposium, vol. 3, pp. 1083-1087 (2002) XP-010611429.

Koike et al., "Hybrid ARQ scheme suitable for coded MIMO transmission," 2004 IEEE International Conference on Paris, pp. 2919-2923 (2004) XP-010712299.

"Antenna diversity in multiuser data networks," IEEE Trans on Communications, col. 52, No. 3, 2004, pp. I 490-I 497, published Mar. 30, 2004.

"Forward link capacity in smart antenna base stations with dynamic slot allocation," Personal, Indoor and Mobile Radio Communications, The Ninth IEEE International Symposium, vol. 2, pp. 942-946, published Sep. 8, 1998.

Taiwan Search Report—Appl. No. 095119226, Dec. 22, 2009.

Zhang, et al., "A constrained mutual information based CQI measure for coded MIMO-CDMA systems," IEEE Communications Society Globecom, pp. 3149-3154, published Nov. 29, 2004.

Communication General Meeting of the Institute of Electronics, Information and Communication Engineers in 2003, B-5-163.

International Search Report and Written Opinion—PCT/US2006/020707, International Search Authority—European Patent Office—Dec. 13, 2006.

Sakaguchi K., et al., "Initial Measurement on MIMO Eigenmode Communication System", IEICE Transactions on Communications, vol. J87-B, No. 9, pp. 1454-1466, 2004.

Ji, et al., "MIMO Channel Transmission with Antenna Selection and Optimum Power Allocation", 2003 General Conference of the Institute of Electronics, Information and Communication Engineers, B-5-163.

Taira, Akinori et al., "Throughput Enhancement for MIMO-OFDM Systems Using Transmission Channel Control", Technical Report of IEICE, RCS, Wireless Communication System, Jan. 8 2004, vol. 103 No. 552, pp. 115-120, RCS 2003-263.

2-7-1-1 Delay diversity, Standard Technologies MIMO (Multi Input Multi Output) related technology, Mar. 25, 2005' URL, http://www.jpo.go.jp/shiryou/s_sonota/hyoujun_gijutsu/mimo/2-7-1.pdf.

Guey J.C., "Concatenated Coding for Transmit Diversity Systems," Vehicular Technology Conference, 1999, IEEE VTS 50th, vol. 5, pp. 2500-2504.

Indue, M., et al., "A Study of MIMO-OFDM with Error Detection Code System", Institute of Electronics, Information and Communication Engineers, Japan, vol. 103; No. 720 (CS2003 158-177); p. 105-110 (2004).

Lucent Technologies: "Increasing MIMO throughput with per-antenna rate control," 3GPP TSG-RANWG1 Meeting #21, Aug. 28, 2001, R1-010879.

* cited by examiner

RANK STEP-DOWN FOR MIMO SCW DESIGN EMPLOYING HARQ

CLAIM OF PRIORITY UNDER 35 U.S.C. §119

This application claims priority to U.S. Provisional Patent Application Ser. No. 60/686,111, filed on May 31, 2005 and entitled "A METHOD AND APPARATUS FOR MIMO SINGLE CODE WORD DESIGN WITH RANK PREDICTION" and U.S. Provisional Patent Application Ser. No. 60/731,146, filed on Oct. 28, 2005, and entitled "RANK STEP-DOWN FOR MIMO SCW DESIGN EMPLOYING HARQ" both assigned to the assignee hereof and hereby expressly incorporated by reference herein.

BACKGROUND

I. Field

The following description relates generally to wireless communications, and more particularly to reducing a rank associated with a user device as a number of transmissions increase within a transmission frame or frames in a wireless communication environment.

II. Background

Wireless communication systems have become a prevalent means by which a majority of people worldwide has come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

More particularly, frequency division based techniques typically separate the spectrum into distinct channels by splitting it into uniform chunks of bandwidth, for example, division of the frequency band allocated for wireless communication can be split into 30 channels, each of which can carry a voice conversation or, with digital service, carry digital data. Each channel can be assigned to only one user at a time. One known variant is an orthogonal frequency division technique that effectively partitions the overall system bandwidth into multiple orthogonal subbands. These subbands are also referred to as tones, carriers, subcarriers, bins, and/or frequency channels. Each subband is associated with a subcarrier that can be modulated with data. With time division based techniques, a band is split time-wise into sequential time slices or time slots. Each user of a channel is provided with a time slice for transmitting and receiving information in a round-robin manner. For example, at any given time t, a user is provided access to the channel for a short burst. Then, access switches to another user who is provided with a short burst of time for transmitting and receiving information. The cycle of "taking turns" continues, and eventually each user is provided with multiple transmission and reception bursts.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations.

Conventional MIMO wireless systems utilize a "static MIMO transmission rank" for multiple transmissions of a packet or multiple packets. There are multiple scenarios where such a transmission limitation can lead to performance degradation.

Reverse Link Control Overhead Limitation: Typical MIMO systems employ a feedback channel from the Access Terminal to the Access point, where a CQI and desired MIMO transmission rank information is sent every few milliseconds. In heavily loaded (high traffic with lots of users) scenario, there may be a delay in this CQI & rank feedback due to limited reverse link feedback capacity or high reverse link channel erasures. In the absence of updated CQI & rank information, Conventional MIMO systems that are unable to update the MIMO transmission rank over multiple transmissions of a packet or multiple packets seemlessly, may not be robust to changing channel conditions, interference levels, leading to late HARQ transmission decodes or packet decode failures.

Forward Link Control Overhead Limitation: To enable successful packet decode, the Access Point needs to signal the Rank and Packet format to the receiver, using the shared control channel in the FL. However, in a heavily loaded scenario, the Access Point may not be able to signal the Rank and Packet format to the receiver, for every transmitted packet, due to overhead limitations. As a result, Conventional MIMO systems that are unable to update the MIMO transmission rank over multiple transmissions of a packet or multiple packets seamlessly, may not be robust to changing channel conditions, interference levels, leading to late HARQ transmission decodes or packet decode failures.

Partial Loaded Scenario: In partially loaded scenario (few users in the network with bursty traffic), the interference levels over multiple HARQ transmissions of a frame can be substantially different. Furthermore, the CQI and rank information computed at the Access Terminal are typically computed using pilots that suffer from a different interference level, relative to data transmission. A MIMO transmission scheme that utilize a "static MIMO transmission rank" for multiple HARQ transmissions of a packet, may not be robust to such interference variations, leading to late terminations and packet decode failures.

Code Repetitions: In systems that employ HARQ, the code-rate decreases with increasing HARQ transmissions. This is because more redundant symbols are sent with increasing HARQ transmissions. Code rates below the base code-rate (say rate 1/5) are achieved via symbol repetitions. Unfortunately, symbol repetitions lead to performance loss. One way to avoid symbol repetitions is to transmit fewer redundant bits over later transmissions to maintain the effective code rate greater than the base code-rate. MIMO transmission schemes can (potentially) easily achieve this by lowering the rank of the MIMO transmission over later HARQ transmissions. Unfortunately, MIMO systems that utilize a "static MIMO transmission rank" cannot accomplish the rank change. As a result, the performance of MIMO systems that utilize a "static MIMO transmission rank" suffers with increasing HARQ transmission.

Due to many reasons mentioned above, there exists a need in the art for a system and/or methodology of improving throughput and reliability in MIMO wireless network systems, by seamlessly varying the rank of the MIMO transmission across multiple HARQ frames, and across multiple packets.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with reducing a rank of a MIMO transmission as a number of transmissions and packets thereto increase, in order to improve robustness to interference and channel variations, CQI and rank feedback delays, forward link control channel overhead signaling delays, and to minimize symbol repetitions. Such systems and/or methods can be employed in a single code word (SCW) wireless communication environment with a hybrid automatic request (HARQ) protocol.

According to a related aspect, a method of performing rank step-down in a transmission frame at the access point can comprise generating a plurality of coded symbols at the access point, updating a rank "M" for a MIMO transmission to a user device, demultiplexing the coded symbols to generate M MIMO transmission layers thereof, and spatially mapping the "M" MIMO transmission layers using a "spatial mapping matrix." The "spatial mapping" can be a generalized delay diversity matrix, a permutation matrix etc., and can be an $M_T \times M$ matrix, where $1 \leq M \leq M_T$. The method may further comprise transmitting the coded symbols using a packet format that has a predefined rank, and/or instructions for transmitting a rank indicator signal to an access terminal with the coded symbols to indicate to the access terminal a rank to use when decoding the coded symbols.

According to a related aspect, a method of performing rank step-down in a transmission frame at the access point, can comprise generating a plurality of coded symbols at the access point, updating a rank "M" for the MIMO transmission to a user device, demultiplexing the coded symbols to generate M MIMO transmission layers with information symbols and $(M_T-M)$ MIMO layers with erasure symbols, and spatially mapping the $M_T$ MIMO transmission layers using a "spatial mapping matrix." The "spatial mapping" can be a generalized delay diversity matrix, a permutation matrix etc., and can be an $M_T \times M_T$ matrix, where $1 \leq M \leq M_T$. The method may further comprise transmitting the coded symbols using a packet format that has a predefined rank, and/or instructions for transmitting a rank indicator signal to an access terminal with the coded symbols to indicate to the access terminal a rank to use when decoding the coded symbols.

According to another aspect, a method of generating the CQI and rank update information at an access terminal can comprise determining an effective SNR for the one or more candidate MIMO transmission ranks, generating capacity numbers corresponding to the effective SNRs, selecting the rank that maximizes the capacity from the set of candidate capacity numbers, and generating CQI information by quantizing the effective SNR corresponding to the chosen rank.

Another aspect relates to a wireless communication apparatus that facilitates updating MIMO transmission rank for a user device within a transmission frame in a wireless communication environment, which can comprise a receiver, processor and memory functionalities required for determining an effective SNR for the one or more candidate MIMO transmission ranks, generating capacity numbers corresponding to the above effective SNR numbers, selecting the rank that maximizes the capacity from the above set of candidate capacity numbers, and generating a CQI information by quantizing the effective SNR corresponding to the chosen. The receiver can be, for instance, a minimum mean-squared error (MMSE) receiver that generates an effective SNR value for a candidate MIMO transmission rank. The apparatus can still further comprise an access terminal transmitter that transmits updated CQI and updated rank information. According to related aspects, the signal may comprise coded symbols in a packet format that has an associated predefined rank. Additionally or alternatively, the receiver may receive a rank indicator signal that indicates to the access terminal a rank to use when decoding the information signal from the access point.

Yet another aspect relates to a wireless communication apparatus, comprising means for receiving a signal, at an access terminal, comprising a plurality of MIMO transmission layers, means for demodulating and decoding the signal for all candidate values of M, and means for performing a hypothesis decoding technique across all candidate values of M, to determine the MIMO transmission rank.

Yet another aspect relates to a wireless communication apparatus, comprising means for receiving a signal at an access terminal, the signal comprising a plurality of MIMO transmission layers, means for demodulating and detecting the Mt−M MIMO layers with erasure symbols, and means for determining the MIMO transmission rank M, for at least one MIMO transmission. The apparatus may further comprise a module for decoding at least one MIMO layer having information symbols therein, using the determined rank, M. According to some aspects, the signal may comprise coded symbols that have been encoded in a packet format that has an associated predefined rank. Additionally or alternatively, the receiver may receive a rank indicator signal that indicates to the access terminal a rank to use when decoding the signal received from the access point.

Still another aspect relates to a computer-readable medium having stored thereon computer-executable instructions for generating a plurality of coded symbols at an access point; updating a MIMO transmission rank M, depending on feedback from an access terminal, or in a deterministic manner to reflect rank step-down; demultiplexing the coded symbols to determine a value, M, of MIMO layers, where M is an integer;

and spatially mapping M layers using a spatial mapping matrix. The computer-readable medium may further comprise instructions for demultiplexing the coded symbols to generate M MIMO transmission layers with information symbols and ($M_T$–M) MIMO layers with erasure symbols, where M and $M_T$ are integers and $1 \leq M \leq M_T$. The computer-readable medium may still further store instructions for transmitting the coded symbols using a packet format that has a predefined rank, and/or instructions for transmitting a rank indicator signal to an access terminal with the coded symbols to indicate to the access terminal a rank to use when decoding the coded symbols.

A further aspect provides for a processor that executes instructions for generating a plurality of coded symbols at an access point; updating a MIMO transmission rank M, depending on feedback from an access terminal, or in a deterministic manner to reflect rank step-down; demultiplexing the coded symbols to determine a value, M, of MIMO layers, where M is an integer; and spatially mapping M layers using a spatial mapping matrix. The processor may further execute instructions for demultiplexing the coded symbols to generate M MIMO transmission layers with information symbols and ($M_T$–M) MIMO layers with erasure symbols, where M and $M_T$ are integers and $1 \leq M \leq M_T$. The processor may still further execute instructions for transmitting the coded symbols using a packet format that has a predefined rank, and/or instructions for transmitting a rank indicator signal to an access terminal with the coded symbols to indicate to the access terminal a rank to use when decoding the coded symbols.

Yet another aspect relates to an apparatus that facilitates performing rank step-down for a user device in a wireless communication environment, comprising a receiver that receives a signal from a user device, a demodulator that demodulates the received signal, a processor that analyzes demodulated information to assess at least one of CQI, rank, transmission schedule, packet format, and resource assignments related tot eh user device, a forward link assignment message (FLAM) generator that appends update information to a signal generated by the processor for transmission to the user device, and a transmitter that transmits the FLAM to the user device. The FLAM generator may generate supplemental FLAMs for transmission to the user device, wherein a supplemental FLAM comprises information related to a rank step-down. Moreover, the FLAM comprises information related to packet format, and each of a plurality of packet formats may have a unique rank associated therewith, which permit the user device to determine its rank.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
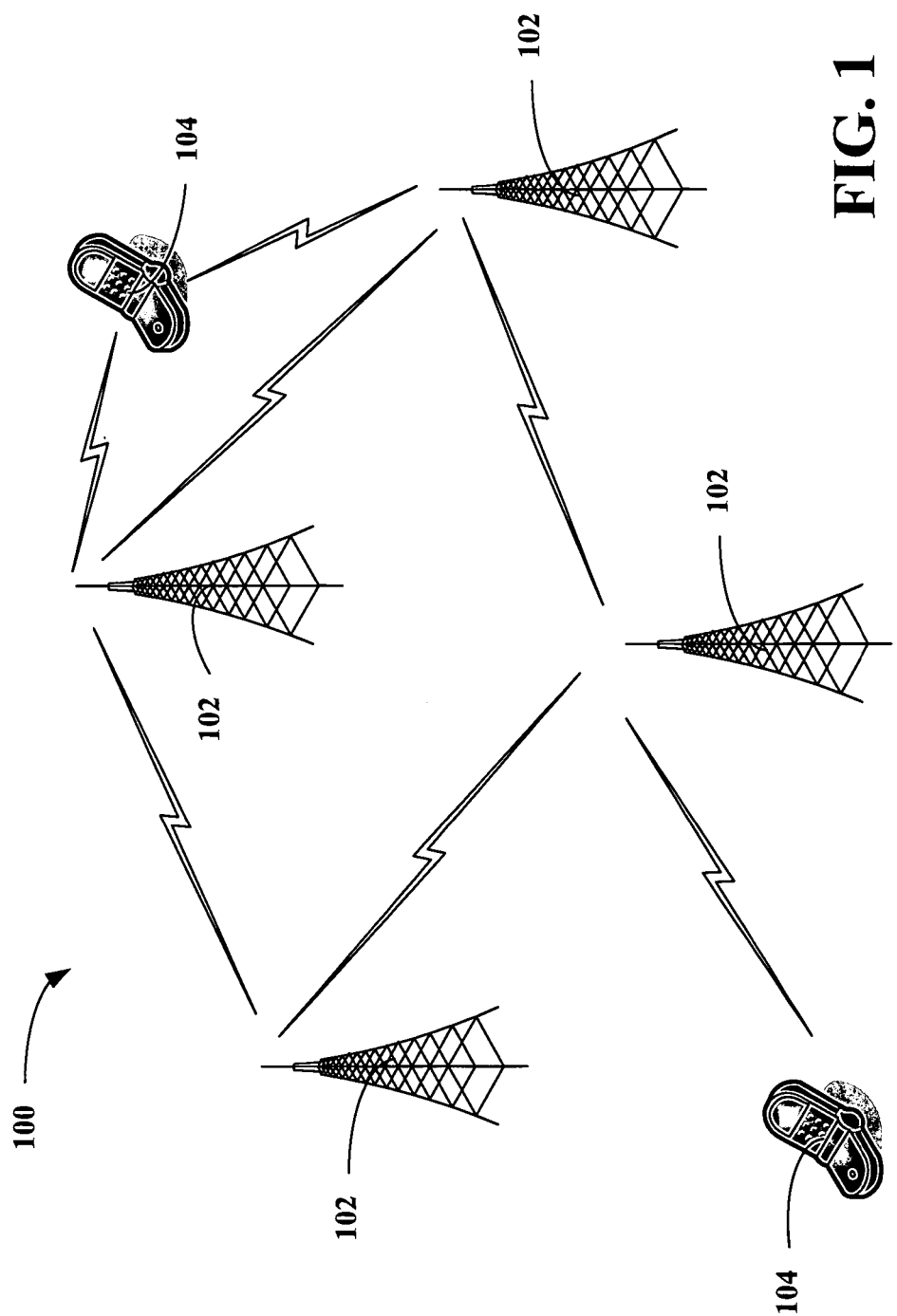
FIG. 1 illustrates a wireless network communication system in accordance with various embodiments presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

Furthermore, various embodiments are described herein in connection with a subscriber station. A subscriber station can also be called a system, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term machine-readable medium" can include, without being limited to, wireless channels and various other media capable of storing, containing, and/or carrying instruction(s) and/or data.

In conventional multiple input-multiple output (MIMO)-single code word (SCW) designs, the SCW-channel quality index (CQI) feedback consists of 5 bits of CQI and 2 bits of rank information. Rank is calculated at the access terminal (AT), or user device, based on the forward link (FL) pilots in a previous transmission frame(s). The rank that maximizes transmission capacity (with some margins for error) is selected as the optimal rank. In partially loaded systems with interference variations, optimum rank can change with each hybrid automatic request (HARQ) transmission.

Referring now to FIG. 1, a wireless network communication system 100 is illustrated in accordance with various embodiments presented herein. Network 100 can comprise one or more base stations 102 (e.g., access points) in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless network 100.

In accordance with various aspects, an SCW design with rank prediction is set forth, which can be employed in a wireless communication network, such as network 100. Algorithms for robust rank prediction and quantification of the performance thereof may be employed, for instance. For example, for a signal-to-noise ratio (SNR)<15 dB (e.g., approximately 90% of the users), the performance of the SCW design with low complexity MMSE receiver and rank prediction can approach that of a multiple code word (MCW) design with successive interference cancellation (SIC). In the absence of a HARQ protocol, SCW can exhibit improved performance over that of MCW, since the latter is more sensitive to channel estimation errors. These factors make SCW a desirable alternative for use in conjunction with a MIMO system due to reduced implementation complexity and computational overhead as compared to MCW systems.

For instance, when SNR [15,20] dB (e.g., approximately 10% of the users), the performance gap between SCW and MCW is less than 1.0 dB for low-K channels, and 2-5 dB for high-K channels. For the high-K channels, performance degradation at high SNRs can be lowered to 1-2 dB by employing dual polarized antennas. Thus, in effect, the SCW design is within 2 dB of MCW design even at high SNRs, while exhibiting the desired reduced complexity and processing overhead discussed above.

Figure 2:
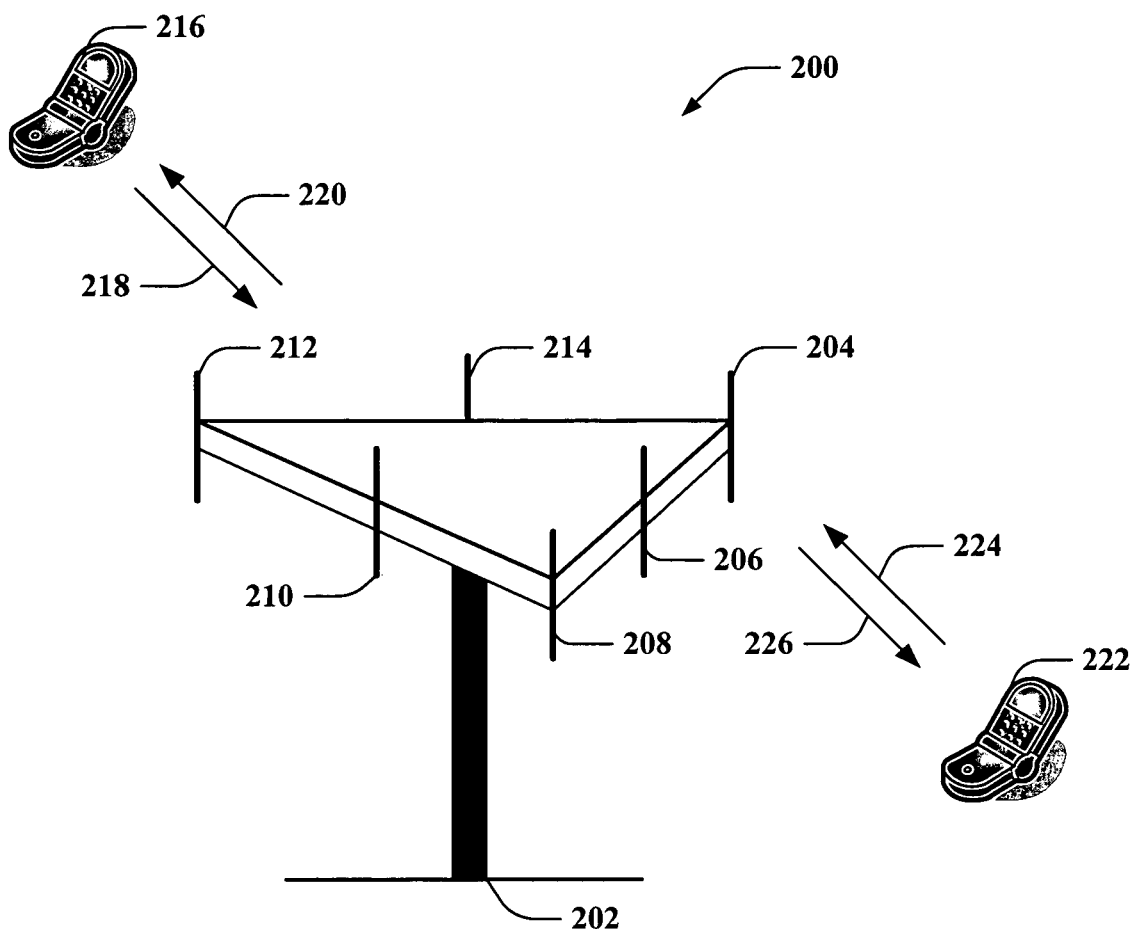
FIG. 2 is an illustration of a multiple access wireless communication system according to one or more embodiments.

Referring now to FIG. 2, a multiple access wireless communication system 200 according to one or more embodiments is illustrated. A 3-sector base station 202 comprises multiple antenna groups: one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 220 and receive information from mobile device 216 over reverse link 218. Mobile device 222 is in communication with antennas 204 and 206, where antennas 204 and 206 transmit information to mobile device 222 over forward link 226 and receive information from mobile device 222 over reverse link 224.

Each group of antennas and/or the area in which they are designated to communicate is often referred to as a sector of base station 202. In some embodiments, antenna groups each are designed to communicate to mobile devices in a sector of the areas covered by base station 202. In communication over forward links 220 and 226, the transmitting antennas of base station 202 can utilize beam-forming techniques in order to improve the signal-to-noise ratio of forward links for the different mobile devices 216 and 222. Additionally, a base station using beam-forming to transmit to mobile devices scattered randomly through its coverage area causes less interference to mobile devices in neighboring cells/sectors than a base station transmitting through a single antenna to all mobile devices in its coverage area. A base station may be a fixed station used for communicating with the terminals and may also be referred to as an access point, a Node B, or some other terminology. A mobile device may also be called a mobile station, user equipment (UE), a wireless communication device, terminal, access terminal, user device, or some other terminology.

According to one or more aspects presented herein, a SCW design with HARQ in interference-limited system can be provided, wherein user rank is reduced with an increasing number of transmissions. Rank step-down can improve robustness to delayed CQI & rank feedback, FL control channel overhead limitations, partial loaded scenarios with time-varying interference levels.

According to various other aspects described herein, rank step-down can be utilized in conjunction with modulation step-down or step-up, as in a SISO system, to ensure that a sufficient number of bits are sent in each transmission, and to make sure that the effective code rate is in a desirable range (e.g., 1/5<rate<1/2). Rank step down can be delayed until after *N* transmissions, such that the step-down protocol need not be performed immediately following a first transmission.

Spectral efficiency (SE) can be evaluated as:

SE=Rank*modulation(bits)*code_rate*transmission number.

According to an example, wherein a minimum acceptable code rate for a given transmission is determined to be 1/5, and SE is hypothetically set to 6 bps/Hz, then without rank stepdown the transmissions proceed as follows:

1$^{st}$ transmission: rank=3, bits=4, code rate=1/2

2$^{nd}$ transmission: rank=3, bits=4, code rate=1/4

3$^{rd}$ transmission: rank=3, bits=4, code rate=1/6

It will be noted that by the third transmission, the code rate has decreased to 1/6, which is below the acceptable rate threshold level preset to 1/5. However, by reducing rank with each successive transmission, code rate can be maintained above the acceptable threshold level for a longer period. For instance according to the same example but with rank step-down, the transmissions proceed as follows:

1$^{st}$ transmission: rank=3, bits=4, code rate=1/2

2$^{nd}$ transmission: rank=2, bits=4, code rate=3/8

3$^{rd}$ transmission: rank=1, bits=4, code rate=1/4

It will be noted that the rank step-down sequence may be a function of the packet format of the transmission signal (e.g., the terminal automatically knows what rank to use in which transmission), in which case an explicit signal is not necessary. Alternatively, the base station may provide a rank indicator signal for each transmission to inform the terminal of the rank to be used when decoding the transmission signal.

Figure 3:
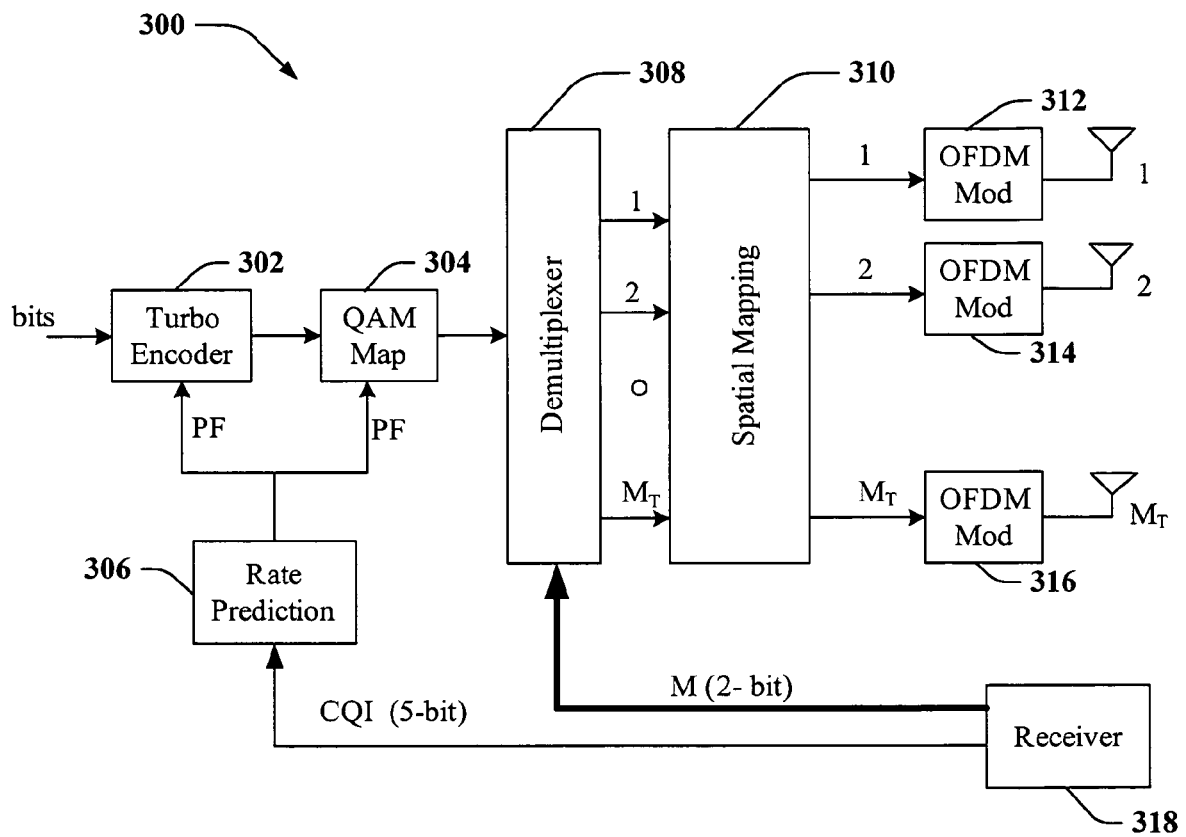
FIG. 3 is an illustration of an SCW transmitter that performs a rank prediction protocol, in accordance with various aspects.

FIG. 3 is an illustration of an SCW transmitter 300 that performs a rank prediction protocol, in accordance with various aspects. Transmitter 300 comprises a turbo-encoder 302, a QAM mapping component 304, and a rate prediction component 306 that manipulates received inputs and provides an encoded, mapped signal to a demultiplexer 308 in a manner similar to that described above with regard to FIG. 3. Coded symbols are then de-multiplexed by demultiplexer 308 to generate M streams, or layers, such that 1≤M≤M$_T$, where M is a 2-bit integer 1≤M≤M$_T$ specified by a receiver 318 via feedback (e.g., approximately every 5 ms), in addition to a 5-bit CQI feedback signal. The M streams are then spatially mapped by spatial mapping component 310 to M$_T$ antennas, after which the rest of the transmission processing is similar to the SISO design. A plurality of respective OFDM modulators 312, 314, and 316, can then modulate the M$_T$ streams for transmission by the M$_T$ antennas.

Spatial mapping component 310 (e.g., a precoder) can generate an M$_T$×M matrix P(k) that maps M symbols on to M$_T$ antennas, for each OFDM tone, k. Spatial mapping component 310 can employ a plurality of options when mapping symbols to antennas.

For example, spatial mapping component 310 can generate a permutation matrix, such that:

$$P_M(k) = \frac{1}{\sqrt{M}} \prod \left[\left\lfloor \frac{k}{B} \right\rfloor \bmod M_T \right]$$

where Π(0), Π(1), ..., Π(M$_T$−1) are the M$_T$×M sub-permutation matrices derived from the M columns of the identity matrix, $I_{M_T \times M_T}$, and B is a parameter to control the frequency selectivity of the equivalent channel. To further this example, if M$_T$=4, M=2, then:

$$\prod[0] = \begin{bmatrix} 1 & 0 \\ 0 & 1 \\ 0 & 0 \\ 0 & 0 \end{bmatrix} \prod[1] = \begin{bmatrix} 0 & 0 \\ 1 & 0 \\ 0 & 1 \\ 0 & 0 \end{bmatrix} \prod[2] = \begin{bmatrix} 0 & 0 \\ 0 & 0 \\ 1 & 0 \\ 0 & 1 \end{bmatrix} \prod[3] = \begin{bmatrix} 0 & 1 \\ 0 & 0 \\ 0 & 0 \\ 1 & 0 \end{bmatrix}$$

According to another example, spatial mapping component 310 can generate a generalized delay diversity matrix, such that:

$$P_M(k) = \frac{1}{\sqrt{M}} \Delta_{M_T \times M_T} \Theta_{M_T \times M}$$

where $\Theta_{M_T \times M}$ is a M$_T$×M sub-DFT matrix obtained from the M columns of the M$_T$×M$_T$ DFT matrix, and $\Delta_{M_T \times M_T}$ is an M$_T$×M$_T$ diagonal matrix, with the (j,j)$^{th}$ entry given by exp $$\left[\frac{j2\pi(k-1)\delta}{N}\right].$$

The parameter δ is the delay-parameter, which also controls the frequency selectivity of the channel, and N is the number of OFDM tones.

Figure 4A:
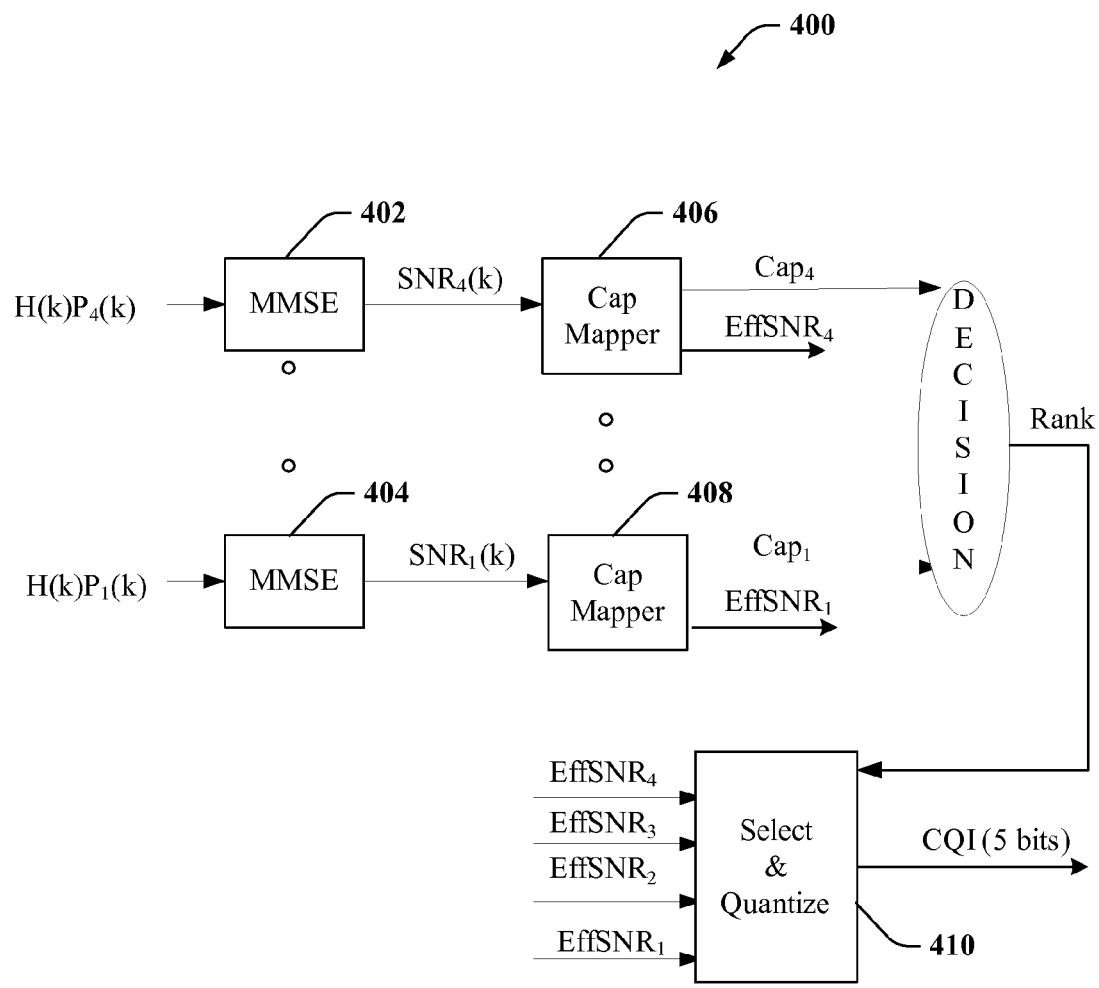
FIGS. 4A and 4B illustrate a system and corresponding method, respectively, that facilitates capacity-based rank prediction, in accordance with various aspects.

FIG. 4A is an illustration of a system that facilitates capacity-based rank prediction, in accordance with various aspects. System 400 a plurality of MMSE receivers 402 through 404, for each of a plurality of received tones. Although FIG. 4 is described with regard to a 4-antenna example for purposes of simplicity, it will be appreciated by those skilled in the art that fewer ore more tones, and respective components, can be employed in conjunction with the various aspects described herein. For each tone, post-processing SNRs for the first though fourth layer transmissions, SNR$_1$(k), SNR$_2$(k), SNR$_3$(k), SNR$_4$(k), are computed for each tone as $$SNR_M(k) \approx \frac{1}{M} \sum_{m=0}^{M-1} \left[ diag\langle [P_M(k)^* H(k)^* H(k) P_M(k) + \sigma^2 I]^{-1} \rangle \right]_{m,m}^{-1}$$

$$\forall M = [1, 4].$$

A 64-QAM constrained-capacity mapping is then performed by a capacity mapping component 406-408 for each tone to generate an effective-SNR averaged over all tones, for the first though fourth layer transmissions, which can be denoted as EffSNR$_1$, EffSNR$_2$, EffSNR$_3$, EffSNR$_4$. The capacities corresponding to the effective SNRs can be denoted as Cap$_1$, Cap$_2$, Cap$_3$, Cap$_4$. An optimum rank can be chosen by a selection/quantization component 810 to maximize over-all spectral efficiency, such that $$\hat{M} = \underset{M=[1,4]}{\arg\max}[M \times Cap_M].$$

A 5-bit CQI can then be fed back to a receiver, such as receiver 318 described with regard to FIG. 3, where CQI ($\hat{M}$)=Quant [EffSNR$_{\hat{M}}$].

Figure 4B:
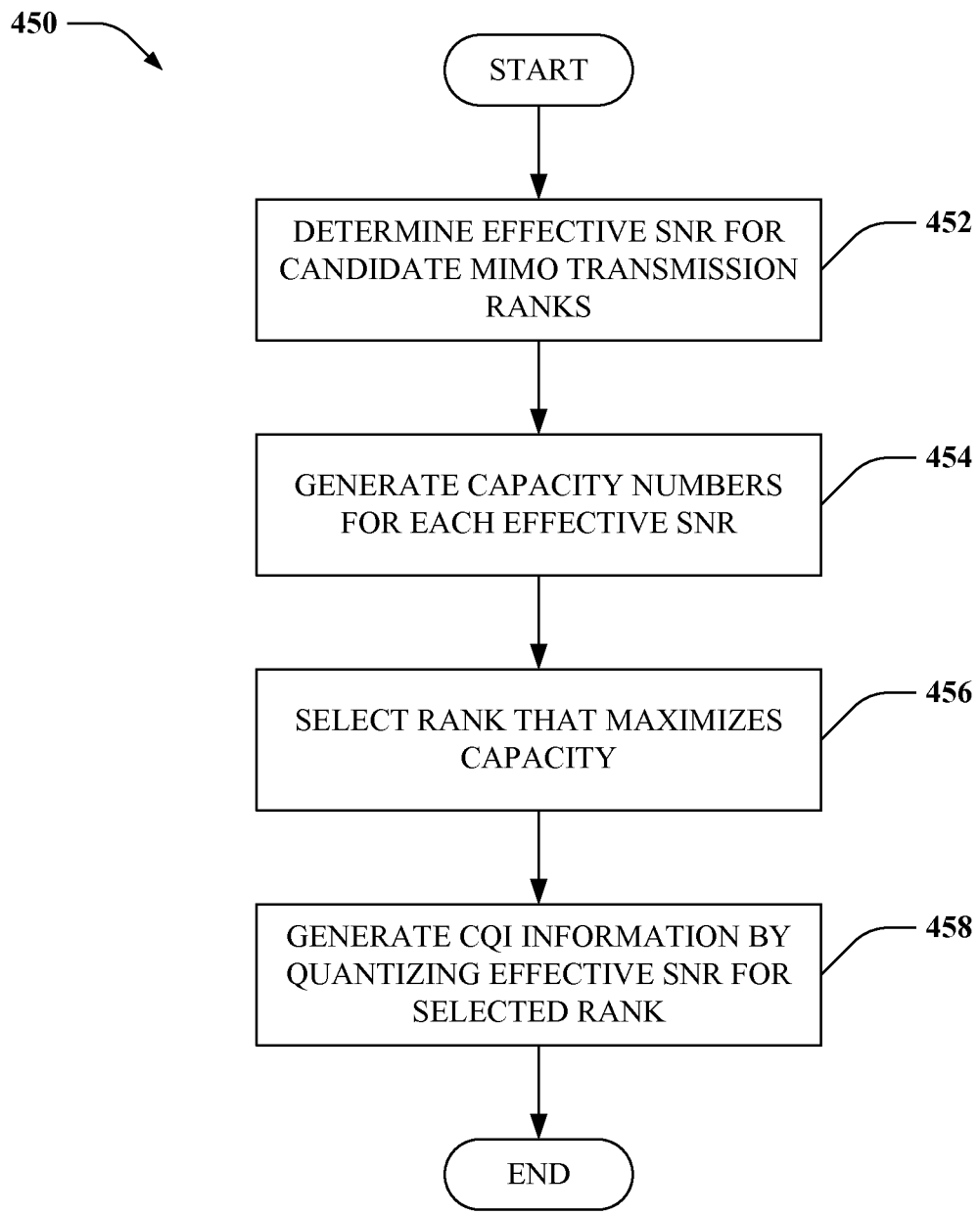

FIG. 4B illustrates a corresponding method 450 for generating CQI and rake update information at an access terminal. Effective SNR is determined for candidate MIMO transmission ranks at 452. Capacity numbers are generated for each effective SNR at 454. A rank that maximizes capacity is selected at 456. CQI information is then generated by quantizing effective SNR for the selected rank at 458.

Figure 5:
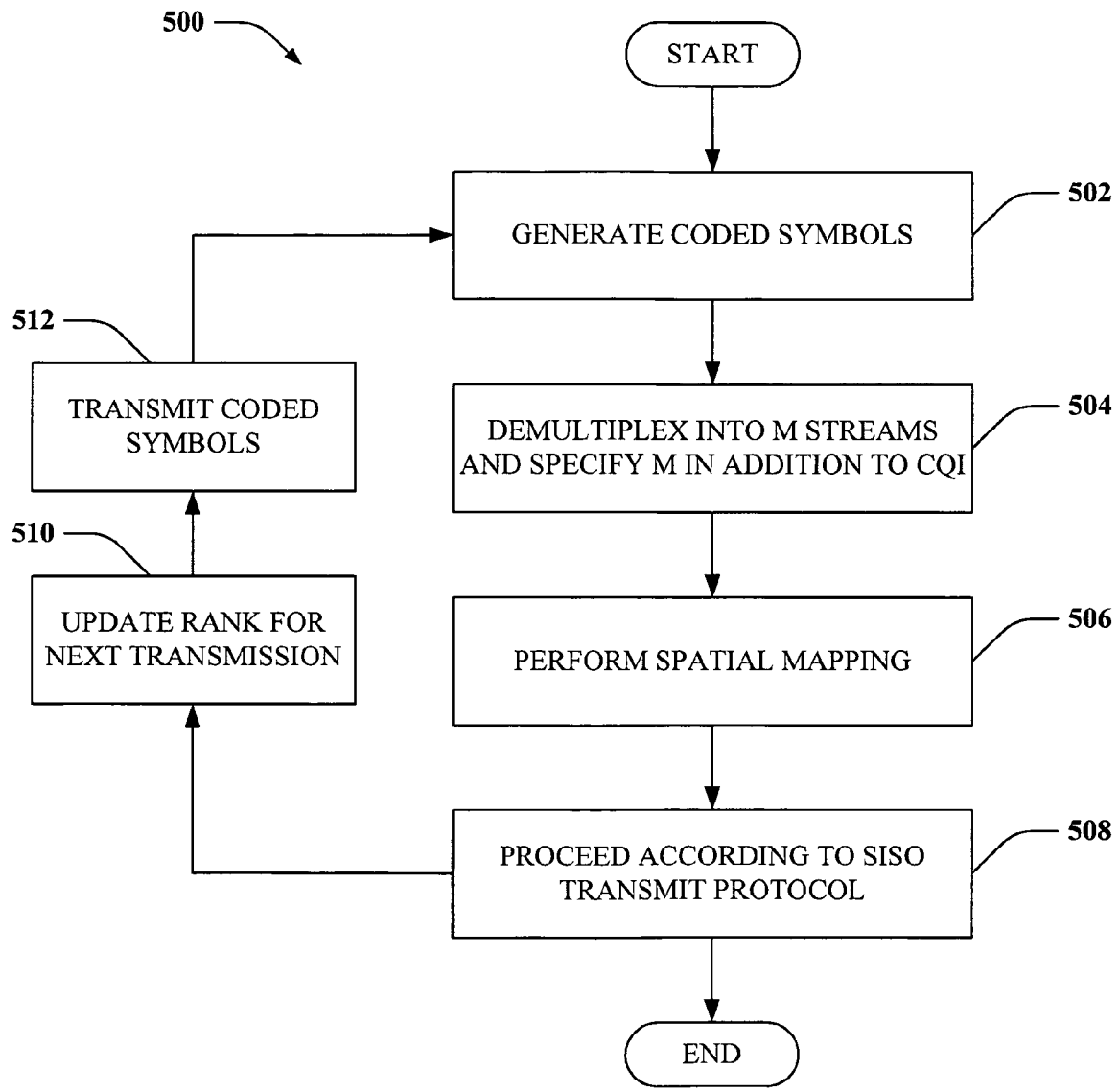
FIG. 5 illustrates a methodology for performing rank prediction and updating user rank within a transmission frame, in accordance with one or more aspects.
Figure 6:
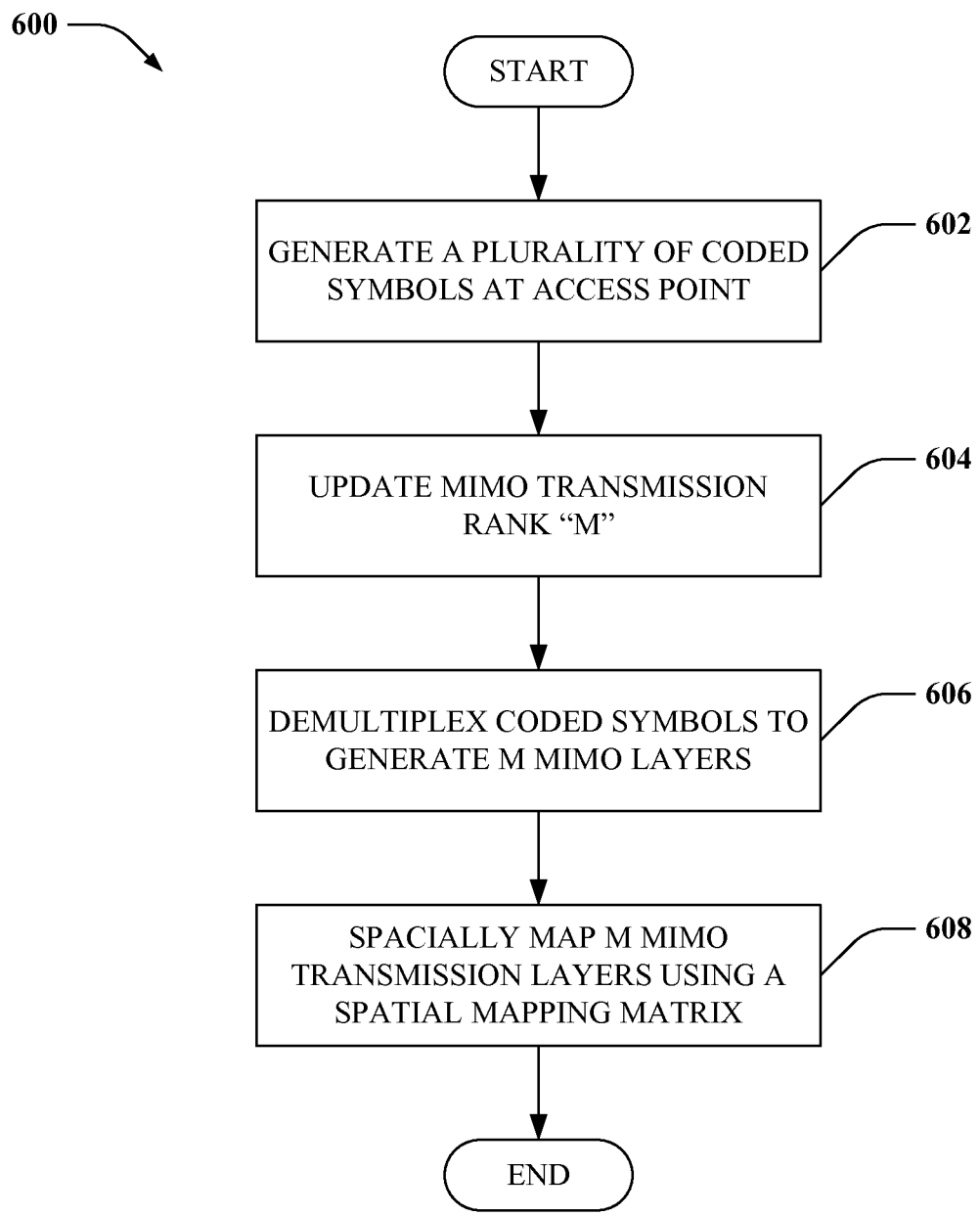
FIG. 6 illustrates a methodology for performing rank prediction and updating user rank within a transmission frame, in accordance with various aspects

Referring to FIGS. 5 and 6, methodologies relating to stepping down rank for a message layer for successive transmissions in a received transmission frame are illustrated. For example, methodologies can relate to rank prediction in an FDMA environment, an OFDMA environment, a CDMA environment, a WCDMA environment, a TDMA environment, an SDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

FIG. 5 illustrates a methodology 500 for updating the MIMO transmission rank for a given user, and for a new transmission frame, in accordance with one or more aspects. At 502, coded symbols can be generated. At 504, the coded symbols can be demultiplexed into M streams, or layers, (e.g., where $1 \leq M \leq M_T$), where M is a 2-bit "rank" between 1 and $M_T$, specified by receiver feedback (e.g., approximately every 5 ms) in addition to a 5-bit CQI. At 506, the M streams can be spatially mapped to $M_T$ antennas, upon which the remainder of transmit processing can proceed in a manner similar and/or identical to a typical SISO protocol, at 508, for transmission in a MIMO wireless communication environment. Additionally, whereby rank is updated for a subsequent transmission at 510, and coded signals associated with the subsequent transmission can be transmitted at 5512.

FIG. 6 is an illustration of a method of performing rank step-down in a transmission frame at an access point, which may comprise generating a plurality of coded symbols at the access point, at 602. At 604, a rank "M" for the MIMO transmission to a user device may be updated. At 606, the coded symbols may be demultiplexed (e.g., demodulated and decoded) to generate M MIMO transmission layers with information symbols and ($M_T$–M) MIMO layers with erasure symbols. At 608, the $M_T$ MIMO transmission layers may be spatially mapped using a "spatial mapping matrix." The "spatial mapping matrix" can be a generalized delay diversity matrix, a permutation matrix etc., and can be an $M_T \times M_T$ matrix. Additionally, M and $M_T$ may be integer values.

Spatial mapping can comprise generating an $M_T \times M$ matrix P(k) that maps M symbols on to $M_T$ antennas, for each OFDM tone, k. According to various aspects, spatial mapping can comprise generation and/or utilization of a permutation matrix, a generalized delay diversity matrix, etc., as set forth above with regard to FIG. 3.

It will be appreciated that, in accordance with one or more aspects described herein, inferences can be made regarding rank step-down, transmission termination, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences regarding when to perform rank step-down, how to initially rank a layer or tone, when to terminate a transmission based on insufficient code rate, etc. For instance, it may be determined that interference at a user device has sharply increased over just a short time (e.g., a few microseconds, milliseconds, etc.). According to an aspect, the rank of the user device can be reduced in response thereto in order to facilitate maintaining an acceptable code rate. If no further rank reduction is possible or desirable, then a transmission session can be terminated. In such a case, the user device need not wait several transmission frames (e.g., 10s of milliseconds) for rank variation or session termination.

According to another example, inferences can be made relating to ranks of successive transmissions in a transmission frame. For example, in a 4-tone scenario, a first transmission can be inferred to have a rank of 4, a second transmission can be inferred to have a rank of 3, and so on, such that code rate can be maintained as described above. It will be appreciated that the foregoing examples are illustrative in nature and are not intended to limit the number of inferences that can be made or the manner in which such inferences are made in conjunction with the various embodiments and/or methods described herein.

Figure 7:
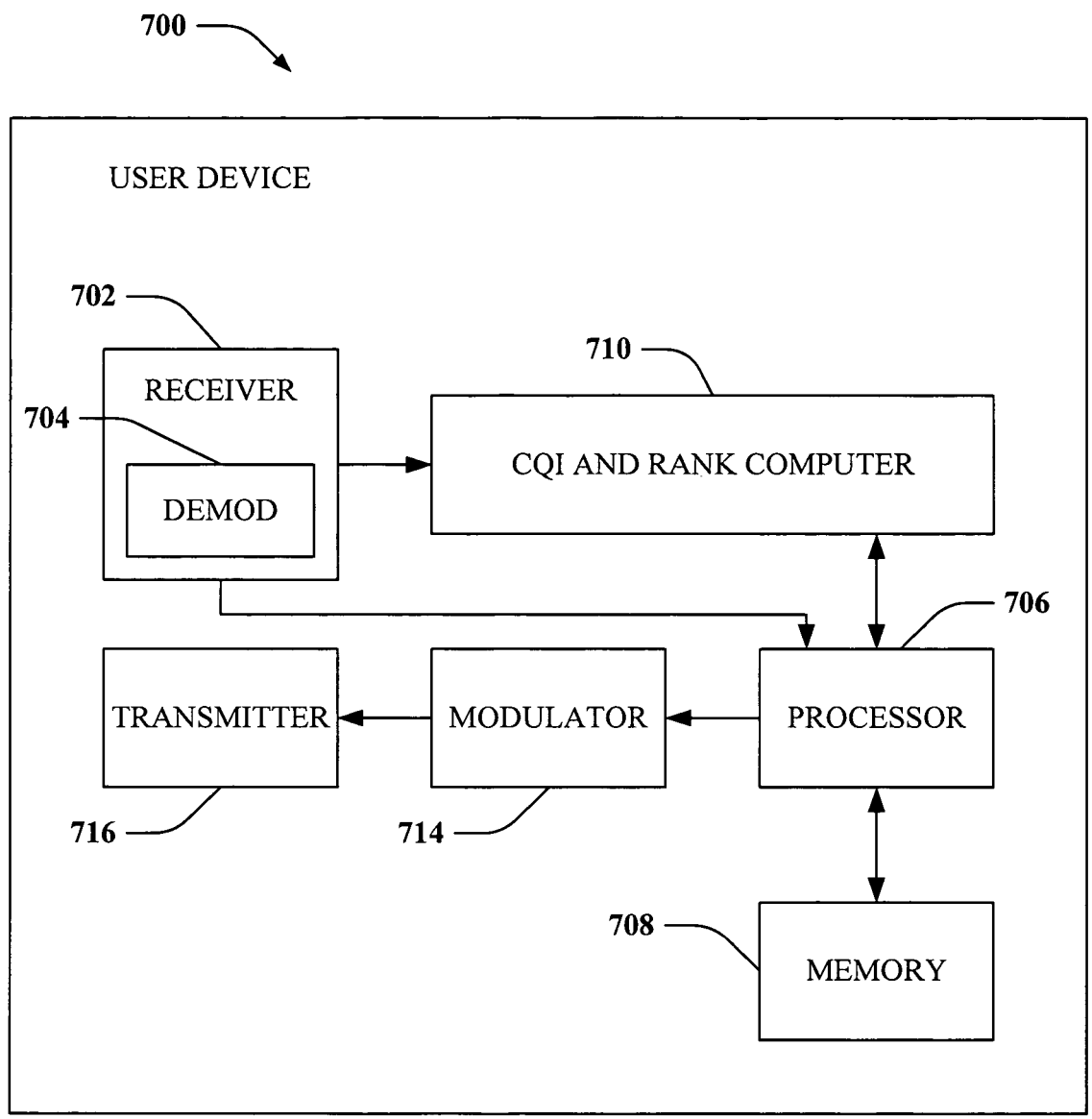
FIG. 7 is an illustration of a user device that facilitates performing rank step-down in a MIMO-SCW wireless communication environment, in accordance with one or more aspects set forth herein.

FIG. 7 is an illustration of a user device 700 that facilitates performing rank step-down in a MIMO-SCW wireless communication environment, in accordance with one or more aspects set forth herein. User device 700 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of user device 700, and/or a processor that both analyzes information received by receiver 702, generates information for transmission by transmitter 716, and controls one or more components of user device 700.

User device 700 can additionally comprise memory 708 that is operatively coupled to processor 706 and that stores information related to MIMO channel matrices, rank prediction, rank of the user device and/or transmission layers, SNR threshold lookup tables, packet formats, resource assignments, and any other suitable information for performing rank step-down in a MIMO-SWC wireless communication system as described with regard to various figures herein. Memory 708 can additionally store protocols associated with performing rank prediction (e.g., performance based, capacity based, . . . ), generating channel matrices, selecting an optimum rank per layer, generating rank update information, etc., such that user device 700 can employ stored protocols and/or algorithms to perform rank adjustment in order to maintain code rates within desired tolerances as described herein.

It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory. Receiver 702 is further operatively coupled to a CQI & Rank computer 710, that performs rank step-down and CQI information generation as described above.

Figure 8:
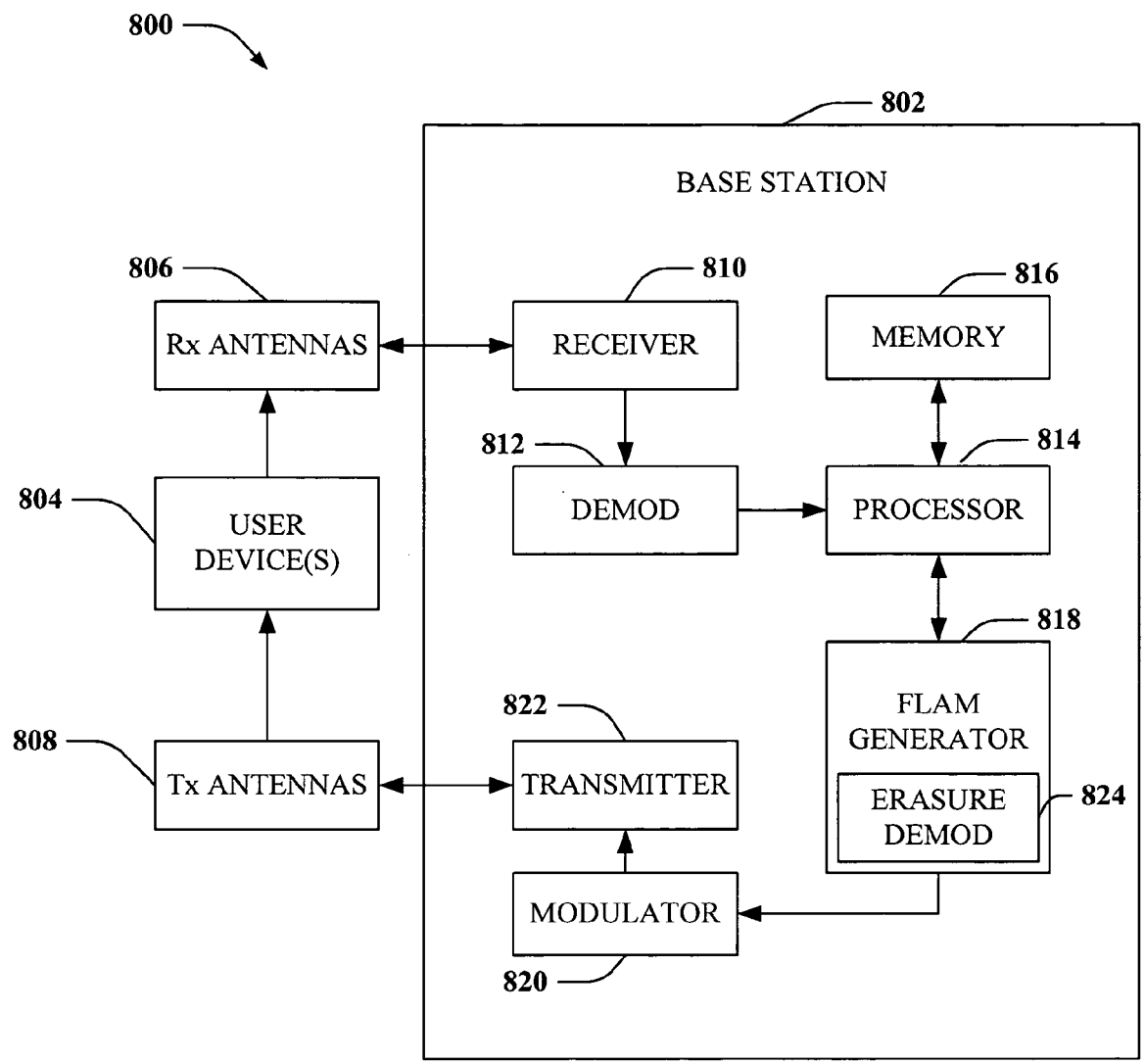
FIG. 8 is an illustration of a system that facilitates performing rank step-down during a transmission event in a wireless communication environment in accordance with various aspects.

FIG. 8 is an illustration of a system 800 that facilitates performing rank step-down during a transmission event in a wireless communication environment in accordance with various aspects. System 800 comprises a base station 802 with a receiver 810 that receives signal(s) from one or more user devices 804 through a plurality of receive antennas 806, and a transmitter 824 that transmits to the one or more user devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 12, and which is coupled to a memory 816 that stores information related to user rank, rank updates and/or step-downs, CQI information received from user devices 804, CQI transmission schedules (e.g., approximately every 5 ms, . . . ), packet formats, resource assignments, and/or any other suitable information related to performing the various actions and functions set forth herein. Processor 814 is further coupled to a forward-link assignment message (FLAM) generator 818 that generates assignment messages for user devices. This message is sent on the FL shared control channel. For example, according to one or more aspects, FLAM generator 818 can append information related to assignments, packet format, rank, etc., for a give user device 804 to a signal generated by processor for transmission to the user device 804. A modulator 820 can multiplex the signal for transmission by a transmitter 822 through transmit antenna 808 to user device(s) 804.

According to an example, FLAM generator 818 can generate an FLAM or a supplemental FLAM to indicate to a user device that user rank has been altered, varied, stepped-down, etc.

In some cases, the FLAM may include information related to packet format for the transmission to the user device, and packet format definitions can comprise inherent rank attributes. For instance, a first packet format may have a rank of 3 associated with it while a second packet format may have a rank of 2 associated with it and so on. It will be appreciated by those skilled in the art that packet formats and associated ranks may comprise any desirable permutation of associations (e.g., direct relationships, inverted relationships, ascending and/or descending relationships or inversions thereof, random correlations, . . . ), and are not limited to the above-described example.

Supplemental FLAMs can provide information related to user rank updates to a user device 804, which can then in turn determine its rank there from. For instance, in a case where rank is tied to packet format, a user device 804 can infer its new rank assignment from the packet format received.

According to a related aspect, a user device 804 may perform a hypothesis decoding technique (e.g., generating a plurality of MIMO matrices and evaluating rank through comparison to a threshold SNR level, . . . ) to determine its new rank assignment, as described above with regard to the preceding figures.

According to a related aspect, a user device 804 may employ an erasure demodulator 824 to perform erasure demodulation of one or more MIMO layers to determine the new MIMO transmission rank.

In this manner, base station 802 can facilitate performing rank step-down with microsecond granularity and providing a more robust user communication experience by mitigating latency associated with rank updates exhibited by conventional static rank assignment systems and/or methodologies, which can unnecessarily tie a user to a rank for periods of seconds or longer.

Figure 9:
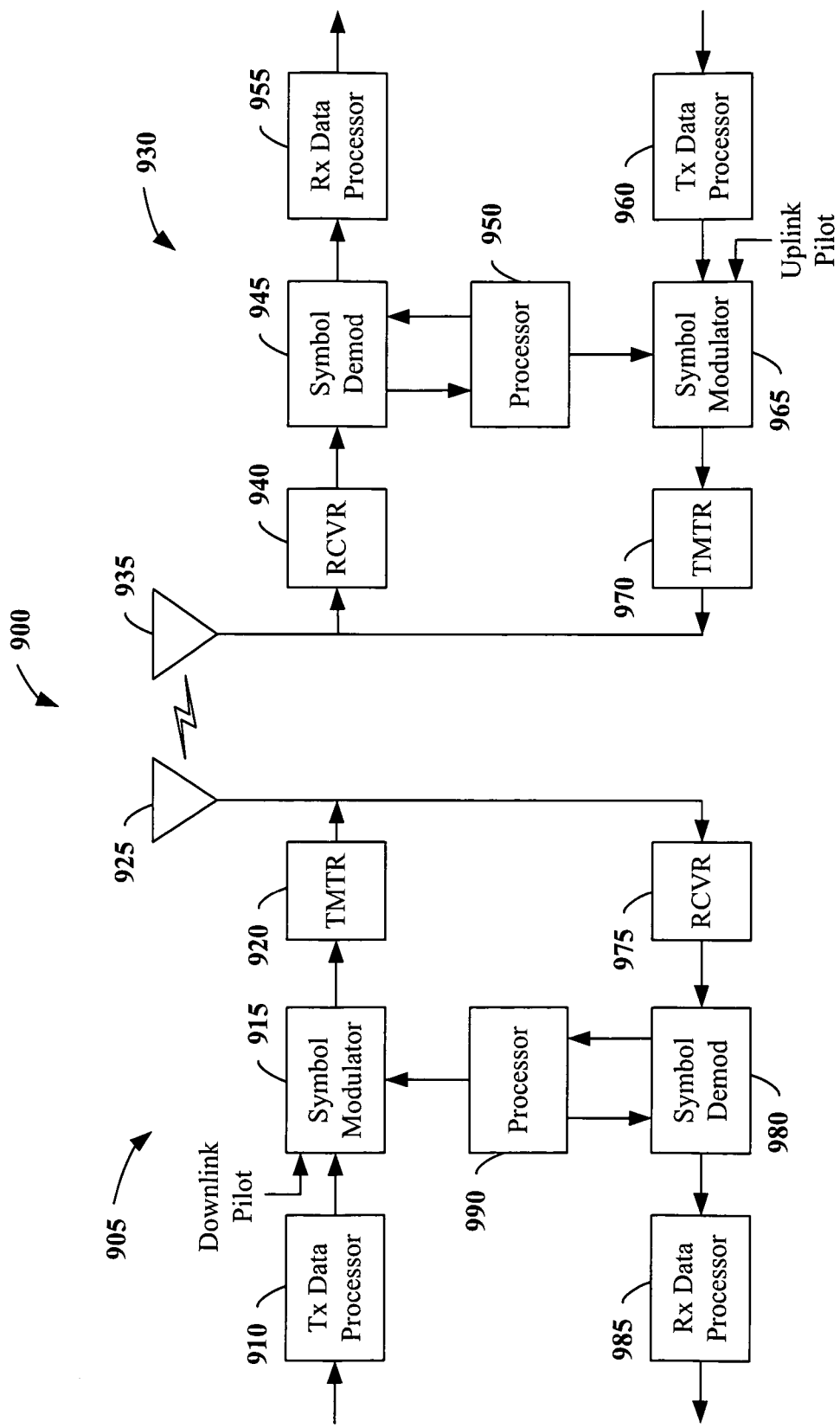
FIG. 9 is an illustration of a wireless network environment that can be employed in conjunction with the various systems and methods described herein.

FIG. 9 shows an exemplary wireless communication system 900. The wireless communication system 900 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 1-4 and 7-8) and/or methods (FIGS. 5 and 6) described herein to facilitate wireless communication there between.

Referring now to FIG. 9, on a downlink, at access point 905, a transmit (TX) data processor 910 receives, formats, codes, interleaves, and modulates (or symbol maps) traffic data and provides modulation symbols ("data symbols"). A symbol modulator 915 receives and processes the data symbols and pilot symbols and provides a stream of symbols. A symbol modulator 915 multiplexes data and pilot symbols and provides them to a transmitter unit (TMTR) 920. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 920 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 925 to the terminals. At terminal 930, an antenna 935 receives the downlink signal and provides a received signal to a receiver unit (RCVR) 940. Receiver unit 940 conditions (e.g., filters, amplifies, and frequency downconverts) the received signal and digitizes the conditioned signal to obtain samples. A symbol demodulator 945 demodulates and provides received pilot symbols to a processor 950 for channel estimation. Symbol demodulator 945 further receives a frequency response estimate for the downlink from processor 950, performs data demodulation on the received data symbols to obtain data symbol estimates (which are estimates of the transmitted data symbols), and provides the data symbol estimates to an RX data processor 955, which demodulates (i.e., symbol demaps), deinterleaves, and decodes the data symbol estimates to recover the transmitted traffic data. The processing by symbol demodulator 945 and RX data processor 955 is complementary to the processing by symbol modulator 915 and TX data processor 910, respectively, at access point 905.

On the uplink, a TX data processor 960 processes traffic data and provides data symbols. A symbol modulator 965 receives and multiplexes the data symbols with pilot symbols, performs modulation, and provides a stream of symbols. A transmitter unit 970 then receives and processes the stream of symbols to generate an uplink signal, which is transmitted by the antenna 935 to the access point 905.

At access point 905, the uplink signal from terminal 930 is received by the antenna 925 and processed by a receiver unit 975 to obtain samples. A symbol demodulator 980 then processes the samples and provides received pilot symbols and data symbol estimates for the uplink. An RX data processor 985 processes the data symbol estimates to recover the traffic data transmitted by terminal 930. A processor 990 performs channel estimation for each active terminal transmitting on the uplink. Multiple terminals may transmit pilot concurrently on the uplink on their respective assigned sets of pilot subbands, where the pilot subband sets may be interlaced.

Processors 990 and 950 direct (e.g., control, coordinate, manage, etc.) operation at access point 905 and terminal 930, respectively. Respective processors 990 and 950 can be associated with memory units (not shown) that store program codes and data. Processors 990 and 950 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 990 and 950.

Figure 10:
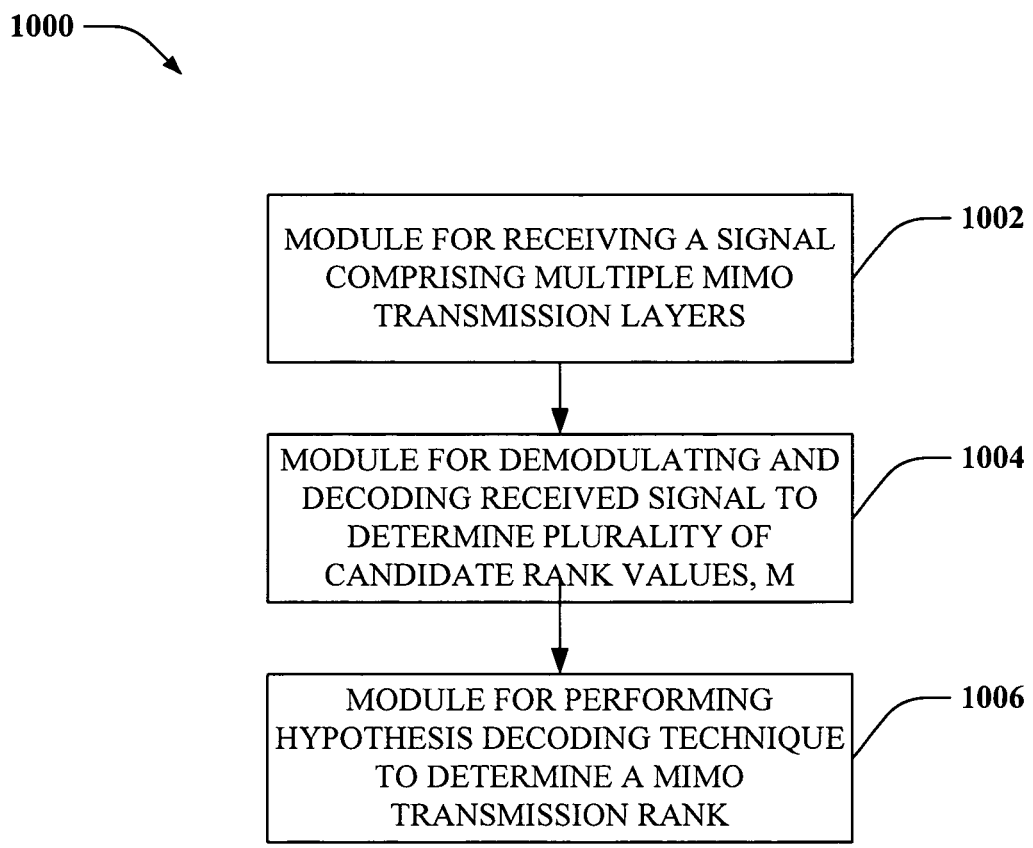
FIG. 10 is an illustration of a system that facilitates performing rank step-down in a wireless communication environment, in accordance with various aspects.

FIG. 10 illustrates a system that facilitates performing rank step-down in conjunction with a hypothesis decoding technique in a wireless communication environment, in accordance with one or more aspects. System 1000 is represented as a series of interrelated functional blocks, or "modules," which can represent functions implemented by a processor, software, or combination thereof (e.g., firmware). For example, system 1000 may provide modules for performing various acts such as are described above with regard to the preceding figures. System 1000 comprises a module for receiving a signal 1002 that comprises a plurality of MIMO transmission layers. System 1000 further comprises a module for demodulating and decoding 1004 the received signal to determine a plurality of candidate rank values, M. For instance, each MIMO transmission layer may have associated therewith a unique candidate rank value. A module for performing a hypothesis decoding technique may then be implemented to determine a MIMO transmission rank for a user device, as described above with regard to various preceding figures. It is to be understood that system 1000 and the various modules comprised thereby may carryout the methods described above and/or may impart any necessary functionality to the various systems described herein.

Figure 11:
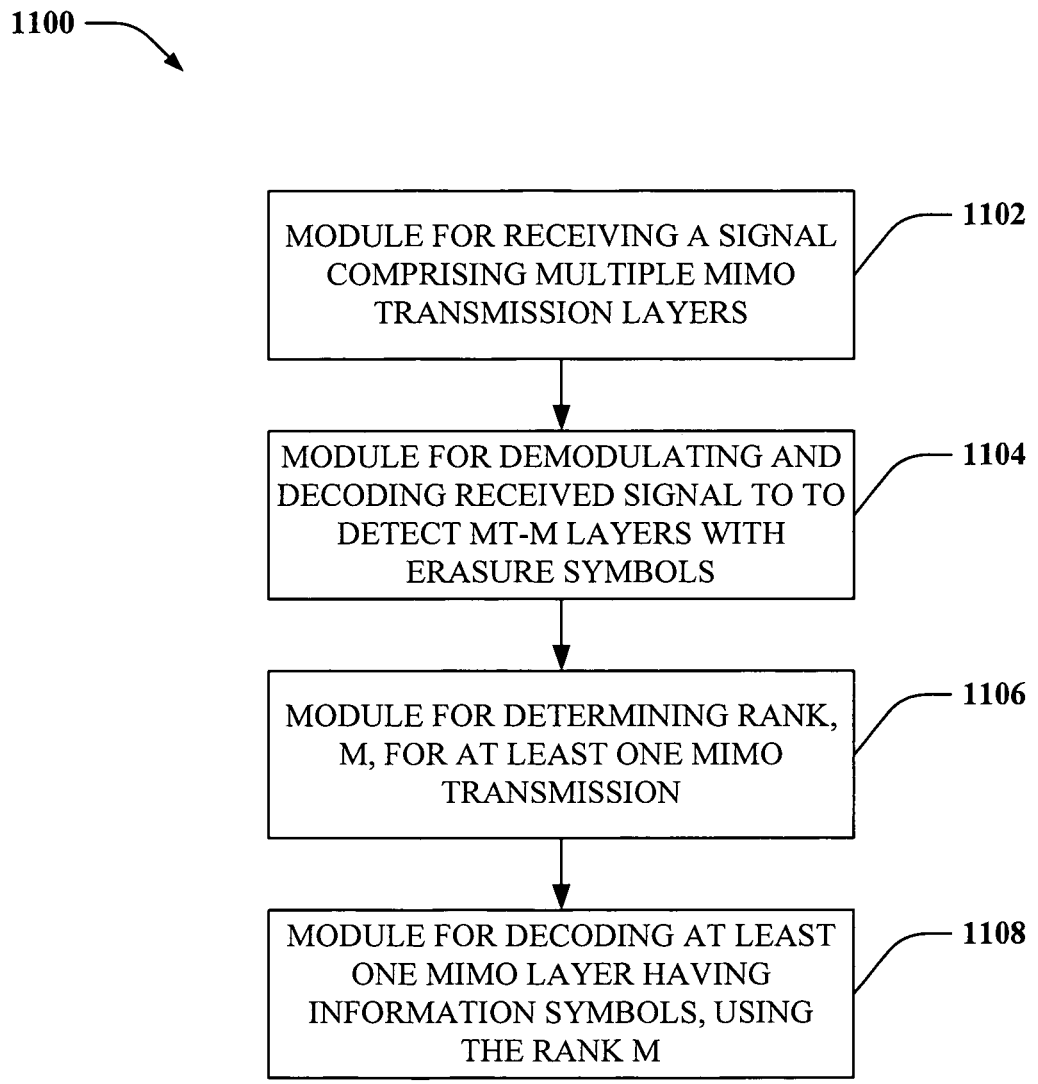
FIG. 11 is an illustration of a system that facilitates performing rank step-down in a wireless communication environment, in accordance with various aspects.

FIG. 11 is an illustration of a system 1100 that facilitates performing rank step-down in conjunction with erasure symbol demodulation, in accordance with various aspects described herein. System 1100 is represented as a series of interrelated functional blocks, or "modules," which can represent functions implemented by a processor, software, or combination thereof (e.g., firmware). For example, system 1100 may provide modules for performing various acts such as are described above with regard to the preceding figures. System 1100 comprises a module for receiving 1102 a signal having a plurality of MIMO transmission layers. A module for demodulating and decoding 1104 may demodulate and decode the received signal to detect $M_T$–M layers, where $M_T$ and M are integers, which have erasure symbols therein. A module for determining rank 1106 may determine a rank, M, for at least one MIMO transmission layer, and a module for decoding at least one transmission layer having information symbols 1108 may decode the at least one information MIMO layer using the determined rank, M. In this manner, system 1100 and the various modules comprised thereby may carryout the methods described above and/or may impart any necessary functionality to the various systems described herein.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of performing rank step-down to preserve code rate across multiple transmissions in a transmission frame, comprising:
   generating a plurality of coded symbols at an access point;
   updating a MIMO transmission rank in a deterministic manner to reflect a rank step down sequence such that the MIMO transmission rank is reduced with successive transmissions,
   wherein the MIMO transmission rank is determined based on spectral efficiency, modulation, code rate, and transmission number;
   demultiplexing the coded symbols to determine a value, M, of MIMO layers with information symbols and ($M_T$–M)

MIMO layers with erasure symbols, where M and $M_T$ are integers and $1 \leq M \leq M_T$; and spatially mapping M layers using a spatial mapping matrix.

2. The method of claim 1, wherein the spatial mapping matrix is a generalized delay diversity matrix.

3. The method of claim 1, wherein the spatial mapping matrix is a permutation matrix.

4. The method of claim 3, further comprising generating the spatial mapping matrix as an $M_T \times M$ matrix.

5. The method of claim 1, further comprising transmitting the coded symbols using a packet format that has a predefined rank.

6. The method of claim 1, further comprising transmitting a rank indicator signal to an access terminal with the coded symbols to indicate to the access terminal a rank to use when decoding the coded symbols.

7. A method of performing rank step down in a transmission frame at an access point in a wireless communication environment, comprising:

generating a plurality of coded symbols at an access point;

updating a rank for a MIMO transmission to a user device in a deterministic manner to reflect a rank step-down sequence such that the MIMO transmission rank is reduced with successive transmissions according to the rank step-down sequence;

wherein the MIMO transmission rank is determined based on spectral efficiency, modulation, code rate, and transmission number;

demultiplexing the coded symbols to generate M MIMO transmission layers with information symbols and ($M_T$−M) MIMO layers with erasure symbols, where M and $M_T$ are integers and $1 \leq M \leq M_T$; and spatially mapping the $M_T$ MIMO transmission layers using a spatial mapping matrix.

8. The method of claim 7, wherein the spatial mapping matrix is a generalized delay diversity matrix.

9. The method of claim 7, wherein the spatial mapping matrix is a permutation matrix.

10. The method of claim 9, further comprising generating the spatial mapping matrix as an $M_T \times M_T$ matrix.

11. The method of claim 7, further comprising transmitting the coded symbols using a packet format that has a predefined rank.

12. The method of claim 7, further comprising transmitting a rank indicator signal to an access terminal with the coded symbols to indicate to the access terminal a rank to use when decoding the coded symbols.

13. A non-transitory computer readable medium having stored thereon computer executable instructions for:

generating a plurality of coded symbols at an access point;

updating a MIMO transmission rank in a deterministic manner to reflect rank step-down sequence such that the MIMO transmission rank is reduced with successive transmissions, wherein the MIMO transmission rank is determined based on spectral efficiency, modulation, code rate, and transmission number;

demultiplexing the coded symbols to determine a value, M, of MIMO layers with information symbols and ($M_T$−M) MIMO layers with erasure symbols, where M and $M_T$ are integers and $1 \leq M \leq M_T$; and spatially mapping M layers using a spatial mapping matrix.

14. The non-transitory computer-readable medium of claim 13, wherein the spatial mapping matrix is a generalized delay diversity matrix.

15. The non-transitory computer-readable medium of claim 13, wherein the spatial mapping matrix is a generalized delay diversity matrix.

16. The non-transitory computer-readable medium of claim 15, further comprising instructions for generating the spatial mapping matrix as an $M_T \times M$ matrix.

17. The non-transitory computer-readable medium of claim 13, further comprising instructions for transmitting the coded symbols using a packet format that has a predefined rank.

18. The non-transitory computer-readable medium of claim 13, further comprising instructions for transmitting a rank indicator signal to an access terminal with the coded symbols to indicate to the access terminal a rank to use when decoding the coded symbols.

19. A processor executing from a non-transitory computer readable medium comprising computer-executable instructions for:

generating a plurality of coded symbols at an access point;

updating a MIMO transmission rank in a deterministic manner to reflect a rank step-down sequence such that the MIMO transmission rank is reduced with successive transmissions according to the rank step-down sequence, wherein the MIMO transmission rank is determined based on spectral efficiency, modulation, code rate, and transmission number;

demultiplexing the coded symbols to determine a, value, M, of MIMO layers with information symbols and ($M_T$−M) MIMO layers with erasure symbols, where M and $M_T$ are integers and $1 \leq M \leq M_T$; and spatially mapping M layers using a spatial mapping matrix.

20. The processor of claim 19, wherein the spatial mapping matrix is a generalized delay diversity matrix.

21. The processor of claim 19, wherein the spatial mapping matrix is a permutation matrix.

22. The processor of claim 21, wherein the non-transitory computer readable medium further comprises instructions for generating the spatial mapping matrix as an $M_T \times M$ matrix.

23. The processor of claim 19, wherein the non-transitory computer readable medium further comprises instructions for transmitting the coded symbols using a packet format that has a predefined rank.

24. The processor of claim 19, wherein the non-transitory computer readable medium further comprises instructions for transmitting a rank indicator signal to an access terminal with the coded symbols to indicate to the access terminal a rank to use when decoding the coded symbols.

25. An apparatus that facilitates performing rank step-down to preserve code rate across multiple transmissions in a transmission frame, comprising:

a processor configured to:

generate a plurality of coded symbols at an access point;

update a MIMO transmission rank in a deterministic manner to reflect a rank step-down sequence such that the MIMO transmission rank is reduced with successive transmissions, wherein the MIMO transmission rank is determined based on spectral efficiency, modulation, code rate, and transmission number;

demultiplex the coded symbols to determine a value, M, of MIMO layers with information symbols and ($M_T$−M) MIMO layers with erasure symbols, where M and $M_T$ are integers and $1 \leq M \leq M_T$; and spatially map M layers using a spatial mapping matrix.

26. The apparatus of claim 25, wherein the spatial mapping matrix is a generalized delay diversity matrix.

27. The apparatus of claim 25, wherein the spatial mapping matrix is a permutation matrix.

28. The apparatus of claim 27, wherein the processor is further configured to generate the spatial mapping matrix as an $M_T \times M$ matrix.

29. The apparatus of claim 25, wherein the processor is further configured to transmit the coded symbols using a packet format that has a predefined rank.

30. The apparatus of claim 25, wherein the processor is further configured to transmit a rank indicator signal to an access terminal with the coded symbols to indicate to the access terminal a rank to use when decoding the coded symbols.

31. A wireless communication apparatus, comprising:
    means for generating a plurality of coded symbols at an access point;
    means for updating a MIMO transmission rank in a deterministic manner to reflect a rank step-down sequence such that the MIMO transmission rank is reduced with successive transmissions,
    wherein the MIMO transmission rank is determined based on spectral efficiency, modulation, code rate, and transmission number;
    means for demultiplexing the coded symbols to determine a value, M, of MIMO layers with information symbols and $(M_T - M)$ MIMO layers with erasure symbols, where M and $M_T$ are integers and $1 < M < M_T$; and
    means for spatially mapping M layers using a spatial mapping matrix.

32. The apparatus of claim 31, wherein the spatial mapping matrix is a generalized delay diversity matrix.

33. The apparatus of claim 31, wherein the spatial mapping matrix is a permutation matrix.

34. The apparatus of claim 33, further comprising means for generating the spatial mapping matrix as an $M_T \times M$ matrix.

35. The apparatus of claim 31, further comprising means for transmitting the coded symbols using a packet format that has a predefined rank.

36. The apparatus of claim 31, further comprising means for transmitting a rank indicator signal to an access terminal with the coded symbols to indicate to the access terminal a rank to use when decoding the coded symbols.

37. A wireless communication apparatus, comprising:
    means for generating a plurality of coded symbols at an access point;
    means for updating a rank for a MIMO transmission to a user device in a deterministic manner to reflect a rank step-down sequence such that the MIMO transmission rank is reduced with successive transmissions according to the rank step-down sequence,
    wherein the MIMO transmission rank is determined based on spectral efficiency, modulation, code rate, and transmission number;
    means for demultiplexing the coded symbols to generate M MIMO transmission layers with information symbols and $(M_T - M)$ MIMO layers with erasure symbols, where M and $M_T$ are integers and $1 < M < M_T$; and
    means for spatially mapping the $M_T$ MIMO transmission layers using a spatial mapping matrix.

38. The apparatus of claim 37, wherein the spatial mapping matrix is a generalized delay diversity matrix.

39. The apparatus of claim 37, wherein the spatial mapping matrix is a permutation matrix.

40. The apparatus of claim 39, further comprising means for generating the spatial mapping matrix as an $M_T \times M_T$ matrix.

41. The apparatus of claim 34, further comprising means for transmitting the coded symbols using a packet format that has a predefined rank.

42. The apparatus of claim 34, further comprising means for transmitting a rank indicator signal to an access terminal with the coded symbols to indicate to the access terminal a rank to use when decoding the coded symbols.

* * * * *